United States Patent [19]

Karg

[11] 4,346,927
[45] Aug. 31, 1982

[54] ADJUSTABLE SPATULA

[76] Inventor: Walter E. Karg, 132 - 1065 Beaverhill Blvd., Winnipeg, Manitoba, Canada

[21] Appl. No.: 193,805

[22] Filed: Oct. 3, 1980

[51] Int. Cl.³ .............................................. A47J 43/28
[52] U.S. Cl. ........................................................ 294/7
[58] Field of Search ................ 294/1 R, 3, 6–8, 294/11, 16, 28, 32, 33, 99 R; 30/1, 123, 124, 136, 142; D7/99, 102

[56] References Cited

U.S. PATENT DOCUMENTS

| | | | |
|---|---|---|---|
| 2,063,432 | 12/1936 | Greene et al. | 294/7 |
| 2,156,014 | 4/1939 | Greene et al. | 294/7 |
| 2,804,335 | 8/1957 | Stillgebauer | 294/1 R |
| 2,862,754 | 12/1958 | Forcia et al. | 294/1 R |
| 3,376,639 | 4/1968 | Pompini | 294/7 X |

FOREIGN PATENT DOCUMENTS 939468  2/1956  Fed. Rep. of Germany ..... 294/1 R

*Primary Examiner*—Johnny D. Cherry
*Attorney, Agent, or Firm*—Stanley G. Ade

[57] ABSTRACT

A spatula for cooking is formed of two halves normally engaging together in side by side relationship. The halves are pivoted to and extend from a handle and have inner ends adjacent the handle which, when squeezed together, cause the halves to diverge outwardly against spring pressure which returns them when released. If desired, the handle may extend forwardly in a planar configuration underlying the junction between the two halves so that the gap between the halves, when opened, is substantially spanned by the forwardly extending portion of the handle.

4 Claims, 3 Drawing Figures

ADJUSTABLE SPATULA

BACKGROUND OF THE INVENTION

This invention relates to new and useful improvements in spatulas, particularly conventional spatulas used for cooking which are engaged under foods to lift same from a frypan or the like.

Conventionally, such spatulas include a substantially rectangular portion which is satisfactory when the width of the food being lifted is less or only slightly larger than the width of the spatula. However, when lifting such things as pancakes, fried eggs, fish fillets and the like, the ends of the food often hang over the side edges of the spatula and break off as the food is lifted by the spatula.

Attempts have been made to form diverging spatulas but these are usually extremely involved mechanically and thus collect grease, food particles and the like which are difficult to clean apart from adding to the expense of manufacture.

SUMMARY OF THE INVENTION

The present invention overcomes these disadvantages and in one embodiment, there is provided a spatula for cooking and the like comprising in combination a handle portion, a pair of spatula halves pivotally supported adjacent the front end of said handle portion and extending forwardly therefrom, in side by side planar relationship, actuating portions extending rearwardly from each of the spatula halves above said handle, but substantially parallel thereto and spring means reacting between said actuating portions normally urging them apart and the spatula halves together.

Another advantage of the present invention is that it is extremely simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 2:
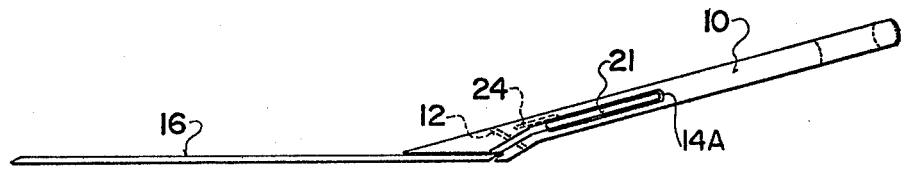
FIG. 2 is a side elevation of FIG. 1.

Proceeding therefore to describe the invention in detail, reference should be made to the drawings in which reference character 10 illustrates a handle portion and reference 11 illustrates two spatula halves. A pivot pin 12 extends upwardly from the center of the substantially planar handle 10 spaced rearwardly from the front end 13 thereof and immediately behind this pivot pin, the handle portion inclines upwardly and rearwardly as clearly shown in FIG. 2.

The handle is substantially planar and includes a pair of upstanding side lips 14, one on each side thereof, which may be covered by a cover panel 15 if desired. However, normally the front end of these retainer lips 14 may act as retainers for the spatula halves and assist in maintaining them in position upon the handle portion.

Figure 1:
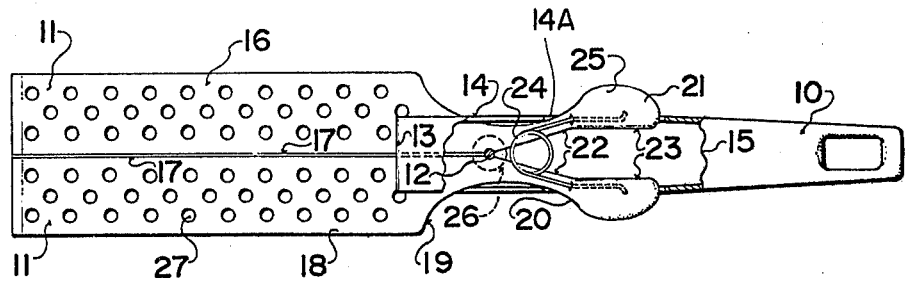
FIG. 1 is a top plan view of the spatula in the closed position.

Each spatula half includes the substantially rectangular operating portion 16 having inner forwardly extending edges 17 which normally meet when the spatula is in the closed position shown in FIG. 1 thus forming a spatula of conventional width and configuration.

The outer edges 18 of each half are substantially parallel to the inner edges 17 for the major portion of the length thereof and then they curve inwardly and rearwardly as illustrated by reference character 19 and then extend rearwardly as at 20 and terminate in actuating handle portions 21, one upon each side of the center line of the handle portion 10.

These actuating portions 21 are substantially parallel to the handle portion. In other words, they also incline upwardly and rearwardly as clearly shown in FIG. 2.

The inner edges 17 extend rearwardly to the pivot pin 12 and then diverge outwardly as at 22 to terminate in the substantially parallel inner edges 23 of the actuating portions 21 and a hair pin spring 24 reacts between the forward ends of the actuating portions and engages under the inturned lips 25 of these portions as clearly illustrated.

The edges 19,20 may engage through apertures 14A in the retaining lips 14 to assist in maintaining the spatula halves in position or, alternatively, the retaining washer 26 may be engaged over the upper end of the pivot pin 12 and be retained thereon by any conventional means.

Figure 3:
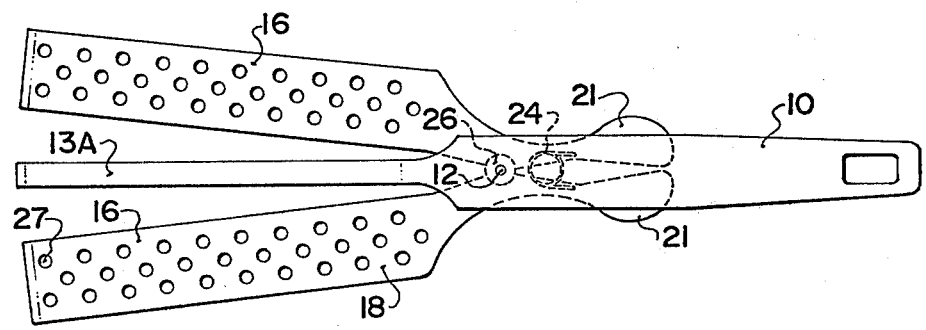
FIG. 3 is a view similar to FIG. 1, but showing the spatula in the opened position, and also illustrating the alternative embodiment with a forward extension from the handle.

In one embodiment, the forward edge 13 of the handle is extended forwardly almost the full length of the spatula halves as indicated by reference character 13A in FIG. 3, underlying the junction between the spatula halves indicated by the inner ends 17 in FIG. 1.

In operation, the spatula is engaged under the food in the usual way whereupon the thumb and forefinger of the user engage the actuating portions 21 and squeeze same towards one another thus causing the spatula halves to spread apart in the same plane to take up the position shown in FIG. 3 thus giving additional support to the food being lifted. If the embodiment shown in FIG. 3 is utilized, then the forwardly extending handle portion 13A assists in supporting the food spanning the gap between the two spatula halves.

It will be appreciated that the spatula halves may be perforated as at 27 in the conventional manner to allow the drainage of fat, liquid or the like.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A spatula for cooking and the like comprising in combination a handle portion, a pair of spatula halves pivotally supported adjacent the front end of said handle portion and extending forwardly therefrom, in side by side planar relationship, actuating portions extending rearwardly from each of the spatula halves substantially parallel to said handle portion and spring means reacting between said actuating portions normally urging them apart and the spatula halves together, said handle portion including apertured retaining lips adjacent said pivotal support, said spatula halves engaging through said retaining lips, the inner edges of said actuating portions of said spatula halves diverging outwardly from one another when said spatula halves are together and a pivot pin extending upwardly from the plane of the handle portion and engaging between said spatula halves at the junction between the inner edges of said spatula halves and the inner edges of said actuating portions, said spring means normally urging and retaining said spatula halves in engagement under said retaining lips.

2. The invention according to claim 1 in which the plane of said handle portion behind said pivotal support of said spatula halves and the plane of said actuating portions incline upwardly and rearwardly from the plane of said spatula halves.

3. The invention according to claim 2 which includes a planar portion extending forwardly from the front end of said handle portion underlying the junction between said spatula halves and substantially spanning the gap therebetween when said actuating portions are squeezed together.

4. The invention according to claim 1 which includes a planar portion extending forwardly from the front end of said handle portion underlying the junction between said spatula halves and substantially spanning the gap therebetween when said actuating portions are squeezed together.

* * * * *